United States Patent
Baldwin

(10) Patent No.: US 7,545,924 B2
(45) Date of Patent: *Jun. 9, 2009

(54) METHOD AND SYSTEM FOR SELECTIVELY PERFORMING CALL INFORMATION QUERY

(75) Inventor: Brian Thomas Baldwin, Lockport, IL (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/900,920

(22) Filed: Sep. 13, 2007

(65) Prior Publication Data

US 2008/0063175 A1    Mar. 13, 2008

Related U.S. Application Data

(63) Continuation of application No. 10/891,831, filed on Jul. 15, 2004, now Pat. No. 7,286,660, which is a continuation of application No. 10/321,789, filed on Dec. 17, 2002, now Pat. No. 6,785,373, which is a continuation of application No. 09/847,648, filed on May 2, 2001, now Pat. No. 6,522,740, which is a continuation of application No. 09/524,498, filed on Mar. 13, 2000, now Pat. No. 6,249,577, which is a continuation of application No. 09/018,973, filed on Feb. 5, 1998, now Pat. No. 6,055,304.

(51) Int. Cl.
*H04M 3/42* (2006.01)
(52) U.S. Cl. .............................. 379/221.13; 379/201.01
(58) Field of Classification Search ............... 379/201.1
See application file for complete search history.

(56) References Cited

U.S. PATENT DOCUMENTS

| | | | |
|---|---|---|---|
| 4,310,727 A | 1/1982 | Lawser | |
| 4,313,035 A | 1/1982 | Jordan et al. | |
| 4,754,479 A | 6/1988 | Bicknell et al. | |
| 5,255,315 A | 10/1993 | Bushnell | |
| 5,315,636 A | 5/1994 | Patel | |
| 5,377,186 A | 12/1994 | Wegner et al. | |
| 5,440,626 A | 8/1995 | Boyle et al. | |
| 5,553,130 A | 9/1996 | Turner | |
| 5,583,926 A | 12/1996 | Venier et al. | |
| 5,598,464 A | 1/1997 | Hess et al. | |
| 5,602,909 A | 2/1997 | Carkner et al. | |
| 5,610,977 A | 3/1997 | Williams et al. | |
| 5,625,681 A | 4/1997 | Butler, II | |

(Continued)

*Primary Examiner*—Creighton Smith
(74) *Attorney, Agent, or Firm*—Brinks Hofer Gilson & Lione

(57) ABSTRACT

A system and method for providing call information query stores modified call information associated with a telephone number within the local databases of a service provider's local network. The modified call information enables a service provider to unilaterally alter how calls are routed and rated. The service switching points (SSPs) located within a same local network are equipped with modified intelligent network or advanced intelligent network software that enables the local SSPs to receive remote call information resulting from a remote query performed by a remote SSP. The local SSPs analyze the remote call information and generate queries to their local databases to obtain modified call information. New services requiring modified call information can then be implemented based upon the modified call information received as a result of the queries.

20 Claims, 5 Drawing Sheets

U.S. PATENT DOCUMENTS

| | | |
|---|---|---|
| 5,748,724 A | 5/1998 | Sonnenberg |
| 5,881,145 A | 3/1999 | Guihat et al. |
| 5,937,056 A | 8/1999 | Coyne et al. |
| 5,999,603 A | 12/1999 | Lo et al. |
| 6,128,503 A * | 10/2000 | Granberg et al. ............ 455/461 |
| 6,370,151 B1 | 4/2002 | Bojanic |
| 6,574,481 B1 | 6/2003 | Rathnasabapathy et al. |

* cited by examiner

METHOD AND SYSTEM FOR SELECTIVELY PERFORMING CALL INFORMATION QUERY

RELATED APPLICATIONS

The present patent document is a continuation of U.S. patent application Ser. No. 10/891,831 (still pending), filed Jul. 15, 2004 now U.S. Pat. No. 7,286,660, which is a continuation of U.S. patent application Ser. No. 10/321,789 (now U.S. Pat. No. 6,785,373), filed Dec. 17, 2002, which is a continuation of U.S. patent application Ser. No. 09/847,648 (now U.S. Pat. No. 6,522,740), filed May 2, 2001, which is a continuation of U.S. patent application Ser. No. 09/524,498 (now U.S. Pat. No. 6,249,577), filed Mar. 13, 2000, which is a continuation of U.S. patent application Ser. No. 09/018,973 (now U.S. Pat. No. 6,055,304), filed Feb. 5, 1998, the entirety of each of which is hereby incorporated by reference.

BACKGROUND

The present invention relates generally to telecommunications systems and more specifically to call information queries.

A modern telecommunications network generally includes at least one national or regional service management system (SMS), at least one local SMS, at least one service control point (SCP), at least one signal transfer point (STP), at least one tandem switch, and at least one service switching point (SSP). A national or regional SMS includes a master database that contains information for a given service or application. The information contained within the national or regional SMS can be concurrently utilized by multiple networks that are operated by different local telephone service providers. A local SMS stores information and acts as an interface between the national or regional SMS and an SCP. An SCP can include an SCP data base that can contain call information consisting of call routing and/or call rating information. The call information contained within an SCP database can be downloaded from the national or regional SMS via a local SMS. Additionally, an SCP receives queries requesting the return of call information. These queries are generated by an SSP. An SCP responds to the query by providing call information to an SSP.

An SSP comprises a high speed switch that transfers voice and data communications within the network. A central office is a call routing center that contains one or more switches that may or may not be equipped with intelligent network (IN) software or advanced intelligent network (AIN) software. An SSP comprises a central office containing one or more switches that is/are equipped with either IN or AIN software. Both the IN and AIN software equipped SSPs can generate queries. Queries are generated when certain predetermined conditions or thresholds are satisfied. When the conditions or thresholds are satisfied, a trigger within the IN or AIN software equipped SSPs is activated which in turn generates the query. Queries are requests for information associated with a telephone number that are transmitted from an SSP to an SCP database. Queries can contain both the telephone number for which associated information is requested and additional data that identifies the type of information that is requested. An STP comprises a high speed switch that transfers signaling commands within the network. An STP transfers queries and responses between an SCP and an SSP. An STP also transfers control signals between networks. A tandem switch transfers voice or data communications between networks.

A service provider typically utilizes a telecommunications network, as described above, to provide telephone service to its customers within a local network. A local network generally comprises the telecommunications network described above and is operated by an individual service provider. The local network typically has geographic boundaries and can contain one or more SSPs. Local networks operated by different service providers can have overlapping geographic boundaries. However, each service provider maintains control over the components that comprise the local network.

Each of the SSPs within the local network provide multiple customers with access to the network. Accordingly, individual customers gain access to the network through one of the SSPs. Each customer is assigned a unique ten digit telephone number which enables calls to be routed to them via their designated SSP. The first six digits of the telephone number, the NPA/NXX, identify the specific SSP that the customer is assigned to and thus facilitates the routing of calls to the customer. Each service provider maintains call routing information that is associated with each ten digit telephone number that also facilitates the routing of calls to the customer. The call routing information indicates the customer's assigned SSP and identifies the location of the customer within the network. Each service provider also maintains call rating information to facilitate the proper rating of calls placed to a customer. The call rating information identifies the location of the customer and is used to calculate the cost associated with terminating a call to the customer. Individual customers are typically assigned to a specific SSP based upon the customers' geographic location. The SSPs with a service provider's network are utilized to provide customers with access to the network.

Protocols are utilized to ensure that communications both with local networks and between local networks can be completed seamlessly. Global protocols are implemented by service providers to ensure that communications between service providers occur properly. Currently, global protocols are being established that allow information to be shared by and exchanged between multiple service providers. These global protocols include specifications regarding the routing of calls. These global protocols may also specify the format of information maintained in databases and the manner in which information in databases can be accessed. Specifically, the global protocols may limit or restrict the number of queries that can be performed for a given telephone number during the completion of a call. These global protocols also reflect the referred practices of sharing information amongst service providers and restricting modifications to this information as well as limiting the access to this information by limiting the number or queries that can be performed.

One such global protocol is embodied in service provider number portability (SPNP) Service Provider Number Portability (SPNP) is currently under development by several network hardware and software providers and will allow customers to retain their existing ten digit telephone number when they change from one service provider to another service provider. According to the SPNP specifications, when a call is placed by a calling party to a called party, the SSP that connects the calling party to the local network (calling party's SSP) must first determine whether the call is placed to a telephone number (called party's telephone number) that has potentially been transferred from one service provider to another service provider. If the number has potentially been ported, the calling party's SSP will launch a query to its local SCP database to obtain information on where to route the call.

The query contains both the called party's telephone number and other data that identifies the type of information, corresponding to the telephone number, that the SSP is requesting. One common request included within a query is for call routing information associated with a telephone number. Upon receipt of the query, the local SCP will search its database to locate call routing information associated with the called party's telephone number. If such information is found, it is transmitted by the SCP to the calling party's SSP. Once the call routing information is received from the local SCP database, the calling party's SSP forwards a special call-setup signaling message to the other SSPs in the call path to advise them that a query has been performed. The other SSPs that are in the call path may include SSPs that are within a different local network and are operated by a different service provider. Bit m of a Forward Call Indicator (FCI) field, which is included within the call-setup message, is used as a query indicator to signify whether a database query has been performed. The call-setup message also identifies where to terminate the call.

The technical requirements that have been documented to support the SPNP specifications expressly state that once a database query has been performed, no additional queries need be performed regardless of the number of subsequent SSPs involved in the call path. Each SSP within the call path can determine whether a query has been performed by analyzing bit m of the FCI. Thus, according to the SPNP specifications, once a query has been performed by a SSP, no other queries can be performed by any other SSP.

The implementation of global protocols such as SPNP results in undesirable limitations. First, every service provider that implements a global protocol must agree and adhere to the predetermined requirements of the protocol. Some of the protocol requirements include: the type of information contained within call information databases; the format of information within the call information databases; and the manner in which call information can be accessed by different network components. These global protocols also limit a single service provider's ability to modify the protocol because the changes must be accepted and implemented by all the service providers that adopt the protocol. Moreover, these changes must be implemented in every local network operated by each service provider that adopts the global protocol. Additionally, the global protocols, such as SPNP limit the number or queries for a single call. Accordingly, these protocols restrain an individual service provider from accessing additional information through the use of additional queries for a single call.

A service provider who wishes to introduce new service that requires a modification of a global protocol, for example the existing format of call information within a database, may not be able to implement such a modification. Because global protocols such as SPNP require that all information be obtained from a single query, changes in information within a local network must be reflected in all the local networks that share information. Therefore, all of the service providers would have to modify their formats in accordance with the modifications implemented by the service provider that seeks to introduce a new service. An individual service provider, however, has no way of mandating that other service provider's accept or implement the desired modifications. Accordingly, there is no way for an individual service provider to ensure that a protocol modification will be universally adopted. Therefore, a service provider cannot unilaterally introduce a protocol modification that may be necessary to provide a new service. Thus, a service provider may be limited in services that it can introduce. A system is needed that allows a service provider to unilaterally introduce new services requiring modifications of global protocol parameters while still supporting the existing global protocols.

DETAILED DESCRIPTION OF THE DRAWINGS

The present embodiment enables a service provider to unilaterally introduce new services that require modification of global protocols, while still supporting the existing global protocols. A service provider can introduce a new service by locally implementing modifications of the global protocol. Because the modification of the global protocol is done locally, it does not require uniform acceptance or implementation by all service providers adopting the global protocol. The service provider can selectively utilize the modifications to provide services dependent upon the modifications. This allows the service provider to unilaterally introduce new services that require modifications of global protocols.

Figure 1:
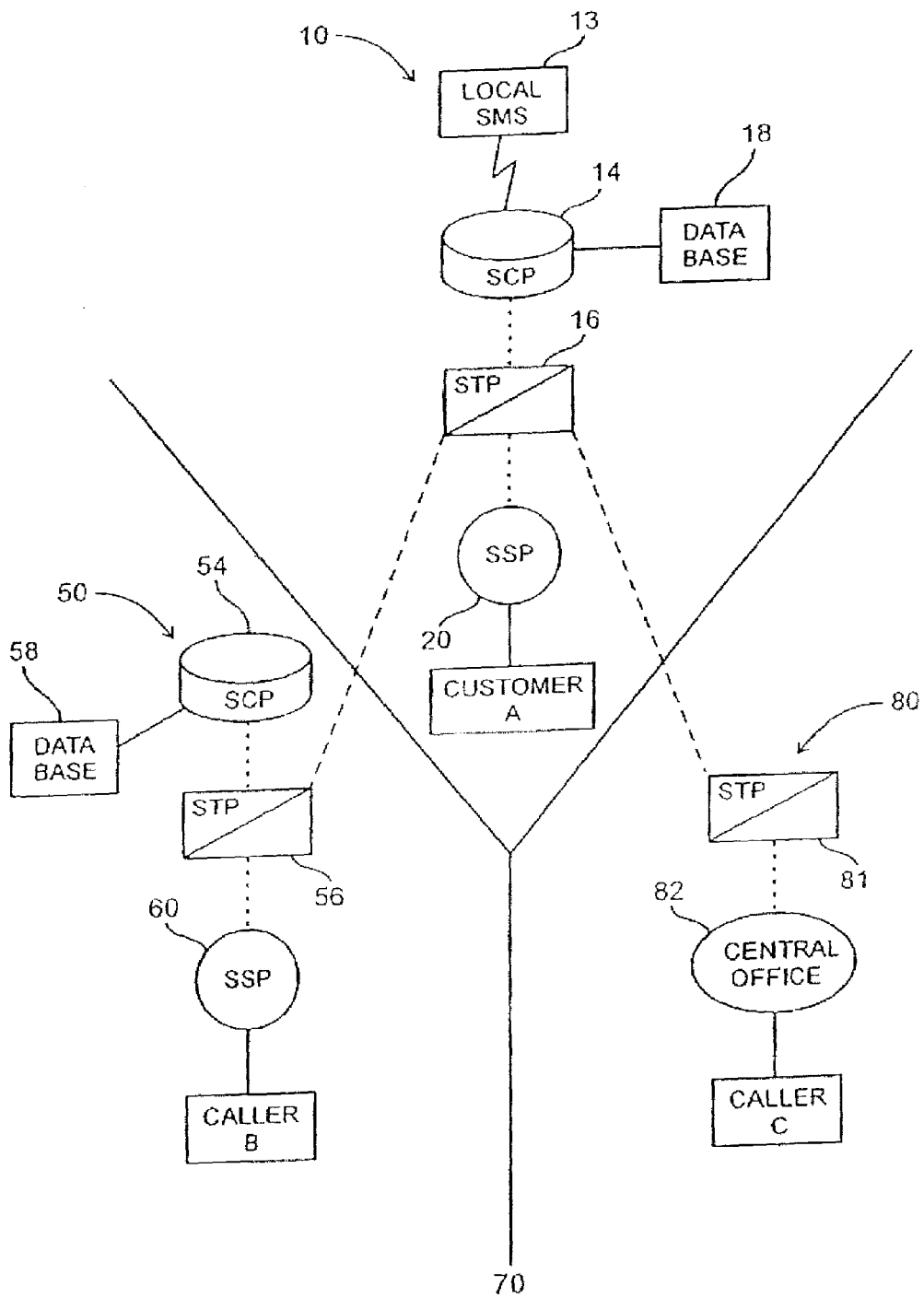
FIG. 1 is a block diagram of a portion of a telecommunications network of a preferred embodiment.

By way of example, FIG. 1 shows portions of three different local networks 10, 50, 80 that are operated by different service providers. Dividing line 70 signifies the boundaries of local networks 10, 50, 80. The local network 10 of customer A includes a current SSP 20, a database 18, an SCP 14 and an STP 16. A first remote local network 50 includes a remote SSP 60, a database 58, an SCP 54, and an STP 56. A second remote local network 80 includes and STP 81, and a remote central office 82. The switches and databases communicate with one another via a high speed signaling protocol such as Signaling System 7 (SS7). Database 58 contains remote call information corresponding to one or more telephone numbers. The remote call information can include call routing information and/or call rating information. Database 18 contains call information associated with customer A's telephone number that has been modified. The modified call information consists of modified call routing information and modified call rating information. The modified call rating information is used to assess the proper costs associated with a new service. The modified call information can also include any other call information that it used to provide a call service. The modified call information can be created by revising call information in an existing format, by changing the format of call information or by adding additional information not previously present in the databases. Database 58 does not contain the modified call information because the modifications were only implemented within local network 10.

Figure 5:
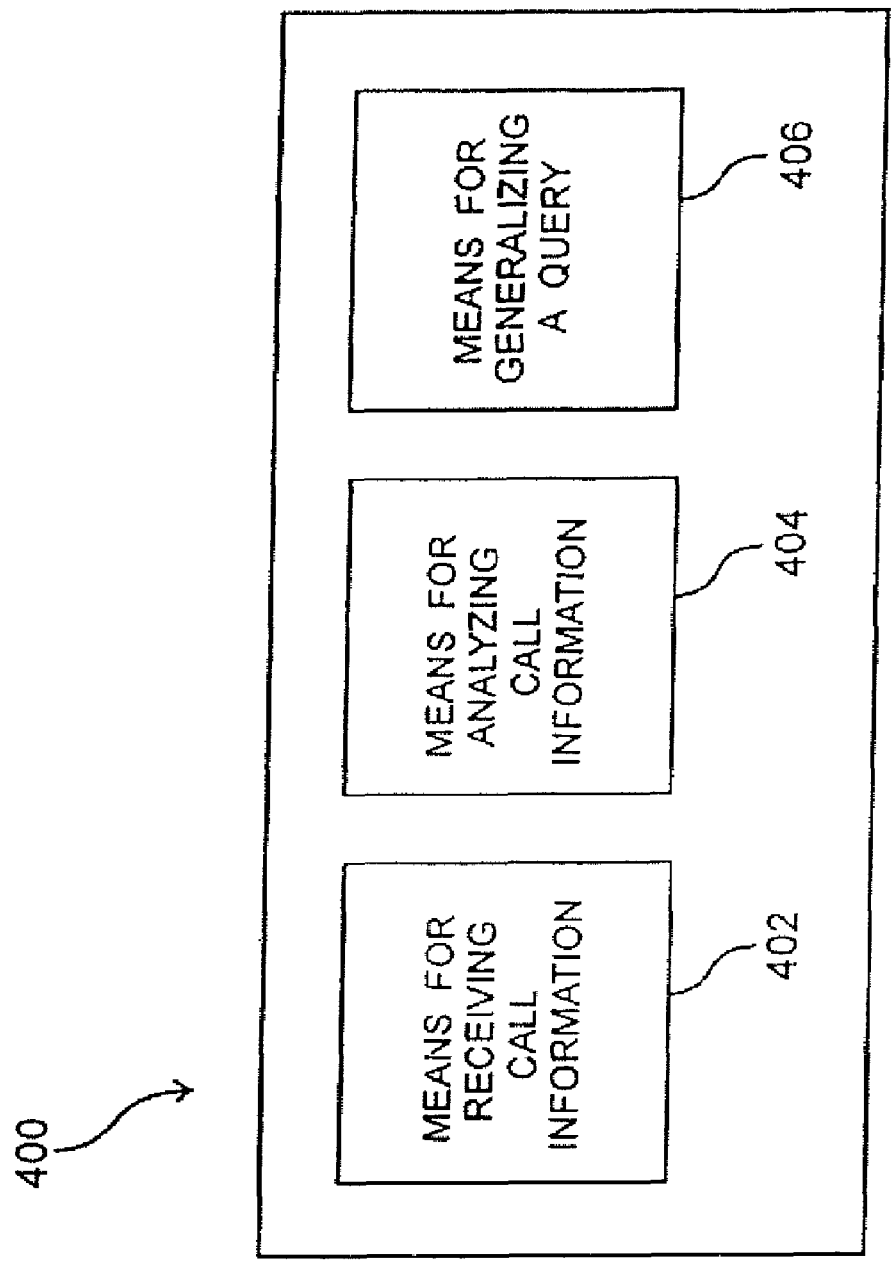
FIG. 5 is a block diagram of a query generation module of a preferred embodiment.

The current SSP 20 and the remote SSP 60 are equipped with modified IN or AIN software. To support the present embodiment, current SSP 20 receives remote call information corresponding to a telephone number, analyzes the remote call information and generates a query to obtain modified call information. To perform these identified functions, current SSP 20 preferably includes a query generation module 400 including means for receiving call information 402, means for analyzing call information 404, and means for generating a query 406, as depicted in FIG. 5. Means for receiving call information 402 comprises hardware preferably comprising a telecommunications switch as well known by those skilled in the art. Alternatively, means for receiving the call information 402 can comprise a combination of hardware and computer readable program code written in any suitable high level programming language. Each of means 404 and 406 preferably comprises computer readable program code written in any suitable programming language and implemented on an analog or a digital computer utilizing any suitable operating system. Alternatively, each of means 404 and 406 can comprise hardware in the form of a hardwired computer, an integrated circuit, or a combination of hardware and computer readable program code.

The current SSP 20 can receive remote call information from either remote SSP 60 or remote central office 82. The remote call information can result from a first query performed by the remote SSP 60. The remote call information received from either remote SSP 60 or remote central office 82 is analyzed by SSP 20 to determine whether to place a query to database 18. Some examples of when a query is appropriate include when the remote call information does not contain all the data needed by current SSP 20 to either route or rate the call or when the remote call information is in a format different from that required by current SSP 20. If necessary, a query can be generated to database 18 to obtain modified call information associated with customer A's telephone number.

Figure 2:
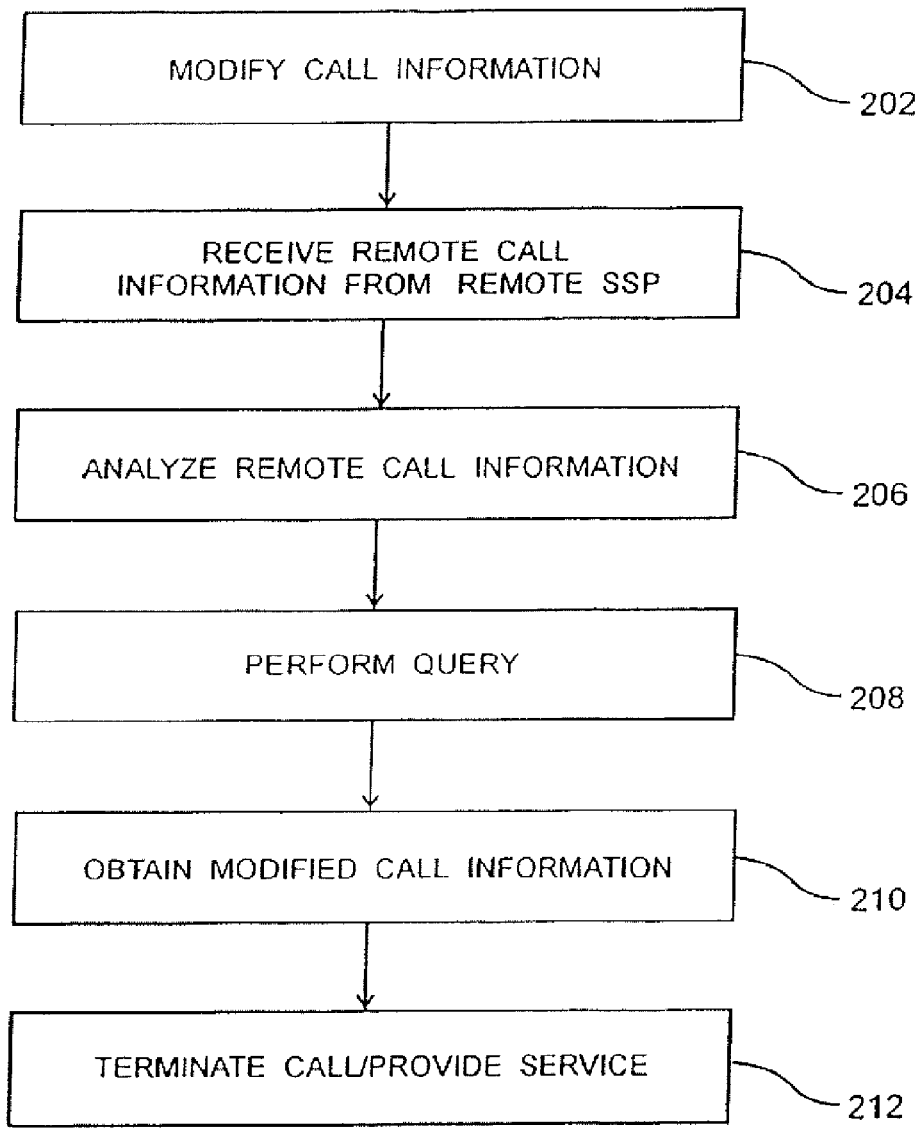
FIG. 2 is a flow chart for a method of a preferred embodiment for providing call information requery.

Referring now to FIGS. 1 and 2, service provider 10 seeks to introduce a new service that uses a modification of the call information associated with the telephone number of customer A. Service provider 10 can proceed to implement the new service by modifying (FIG. 2, 202) its own call information database 18 to include the modified call information, for customer A's telephone number, as appropriate to implement the new service. Both local networks 10, 50 implement a global protocol such as SPNP that prescribes the format of information within databases 18, 58 and that limits the number of queries that can be performed for a single call. Local network 80 does not implement such a global protocol. Accordingly, all modifications of parameters proscribed in the global protocol should be implemented in both local networks 10, 50 to ensure effective communications between the networks 10, 50. Local Network 80 does not include a call information database. Calls are routed based upon the dialed NPA/NXX for a called telephone number. Thus, modified routing information is not incorporated into local network 80. Accordingly, the modified call information created within local network 10, should be incorporated into the databases within local networks 10, 50. However, since the service provider operating local network 10 cannot mandate the adoption of the modifications because they deviate from the global protocol, the modified call information is not incorporated into call information database 58 of remote local network 50.

When caller B places a call to customer A, remote SSP 60 will perform a remote query in accordance with the global protocol to obtain call information associated with customer A's telephone number. Remote SSP 60 will then route the call based upon the call information obtained from the remote query. Because the modified call information has not been implemented within local network 50, remote SSP 60 only has access to remote call information that is not modified. Accordingly, the unmodified remote call information will be transferred to current SSP 20 as the call is routed by remote SSP 60. Current SSP receives the remote call information from SSP 60 as indicated in step 204 of FIG. 2. However, the remote call information received from SSP 60 does not include the modifications necessary to implement the new service. Upon receipt of the remote call information from remote SSP 60, current SSP 20 analyzes the remote call information (step 206) and determines that the remote call information does not contain the necessary modifications. Current SSP 20 then generates a requery (step 208) to database 18 to retrieve the modified call information. Current SSP 20 receives the modified call information (step 210) and can terminate the call or effectuate the new service (step 212) by properly routing and rating the call or by effectuating the new service in accordance with the modified call information.

When caller C places a call to customer 23, remote central office 82 will analyze the dialed NPA/NXX and route the call based upon the dialed numbers. Provided that caller C dials the proper number for customer A's telephone number, the call will be routed to current SSP 20. Current SSP 20 receives the remote call routing information (FIG. 2, step 204) from central office 82. However, the remote call information received from central office 82 does not include the modifications necessary to implement the new service. Upon receipt of the remote call information, current SSP 20 analyzes the remote call information (step 206) and determines that the remote call information does not contain the necessary modifications. Current SSP 20 then generates a query (step 208) to database 18 to retrieve the modified call information. Current SSP 20 receives the modified call information (step 210) and can terminate the call or effectuate the new service (step 212) by properly routing and rating the call or by effectuating the new service in accordance with the modified call information.

By way of further example, the system and method described above can be used to implement specific services such as geographic number portability (GNP). GNP theoretically allows customers to retain their ten digit telephone number when their telephone number is ported. A telephone number is ported whenever a customer moves to a new geographic location whereby the customer is either connected to an SSP that differs from their previous SSP or the customer is relocated in a different rate center or rate district.

Figure 3:
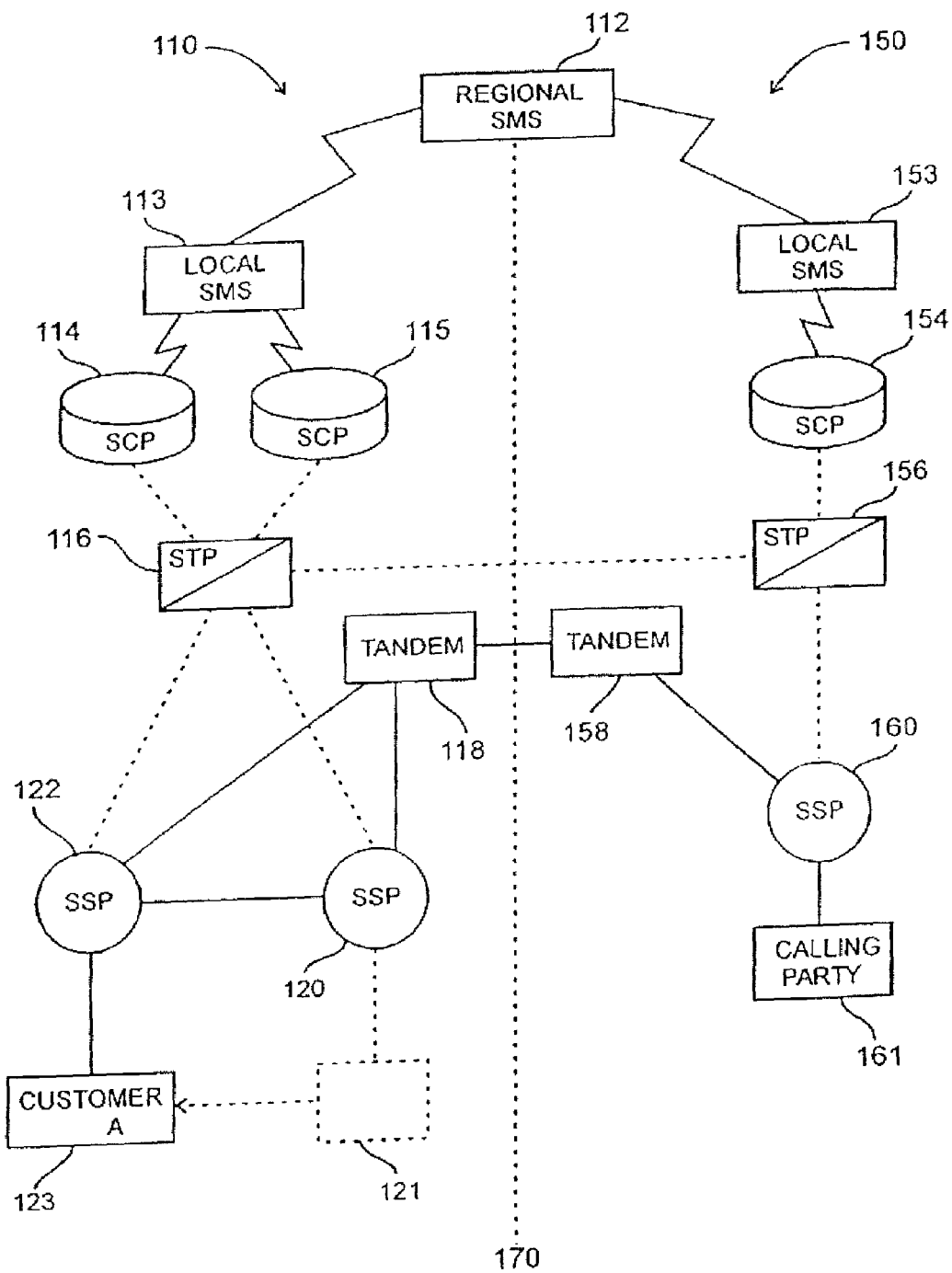
FIG. 3 is a block diagram of telecommunications network of a preferred embodiment.

FIG. 3 shows two different local networks 110, 150 that are operated by two different service providers. Dividing line 170 signifies the boundaries of local networks 110, 150. Both local networks 110, 150 implement the global protocol SPNP as described above. Thus, the number of queries that can be performed for a single call are limited. Accordingly, all modifications of call information, including revisions and changes of call information data formats are preferably uniformly incorporated into all local networks to ensure effective communications between networks. Also, a single service provider cannot unilaterally dictate modifications of call information. Thus, all current call information preferably share a common format in each service provider's databases and are preferably concurrently updated in each service provider's databases.

In this example, customer A has moved geographically within local network 110 from prior location 121 to the current location. Customer A has been reassigned from prior SSP 120 to current SSP 122 but has retained the ten digit number previously associated with prior SSP 120. Thus, customer A's telephone number has been ported. Current call information is created for customer A to reflect the change in location and the reassignment to current SSP 122. Current call information preferably includes revised or updated call rating and call routing information associated with a telephone number. Current call information can also comprise new parameters of information associated with a telephone number or any other information which would allow a service provider to bill any changes uniquely associated with portability. The creation of current call information ensures that calls directed to customer A will be properly routed the customer A at the current SSP 122 and that the additional charges associated with the additional routing can be properly billed.

Current call information for customer A consisting of revised call routing and rating information as discussed above has been created. The current call information for customer A has been stored within the SCP database 114 of local network 110 but has not been stored in the SCP database 154 or the regional SMS 112. Because the service is uniquely offer within local network 110, there are many possible occurrences which can result in SCP database 154 not having current call information. Accordingly, SCP database 114 contains the current call information for customer A while SCP database 154 contains the prior call information for customer A which relates the prior location at prior SSP 120. Thus, if a call directed to customer A is placed in network 150, remote SSP 160 Will obtain prior call information and will route the call to prior SSP 120. However, the call can not be terminated to customer A because he is now located at current SSP 122.

Prior SSP 120 receives the prior call information, analyzes the prior call information, and generates a requery to obtain current call information. Prior SSP 120 preferably includes a query generation module 400, as described above and depicted in FIG. 5, enabling it to receive prior call information, analyze the prior call information, and generate a requery. Prior SSP 120 can ignore the query indicator set by remote SSP 160 after analyzing the prior call information. Prior SSP 120 can generate a requery to SCP database 114 to obtain current call information for customer A. Upon receiving the current call information, prior SSP 120 can properly route the call to customer A at current SSP 122. Additionally, any added costs associated with the rerouting of the call to current SSP 122 can be properly rated according to the current call information.

Figure 4:
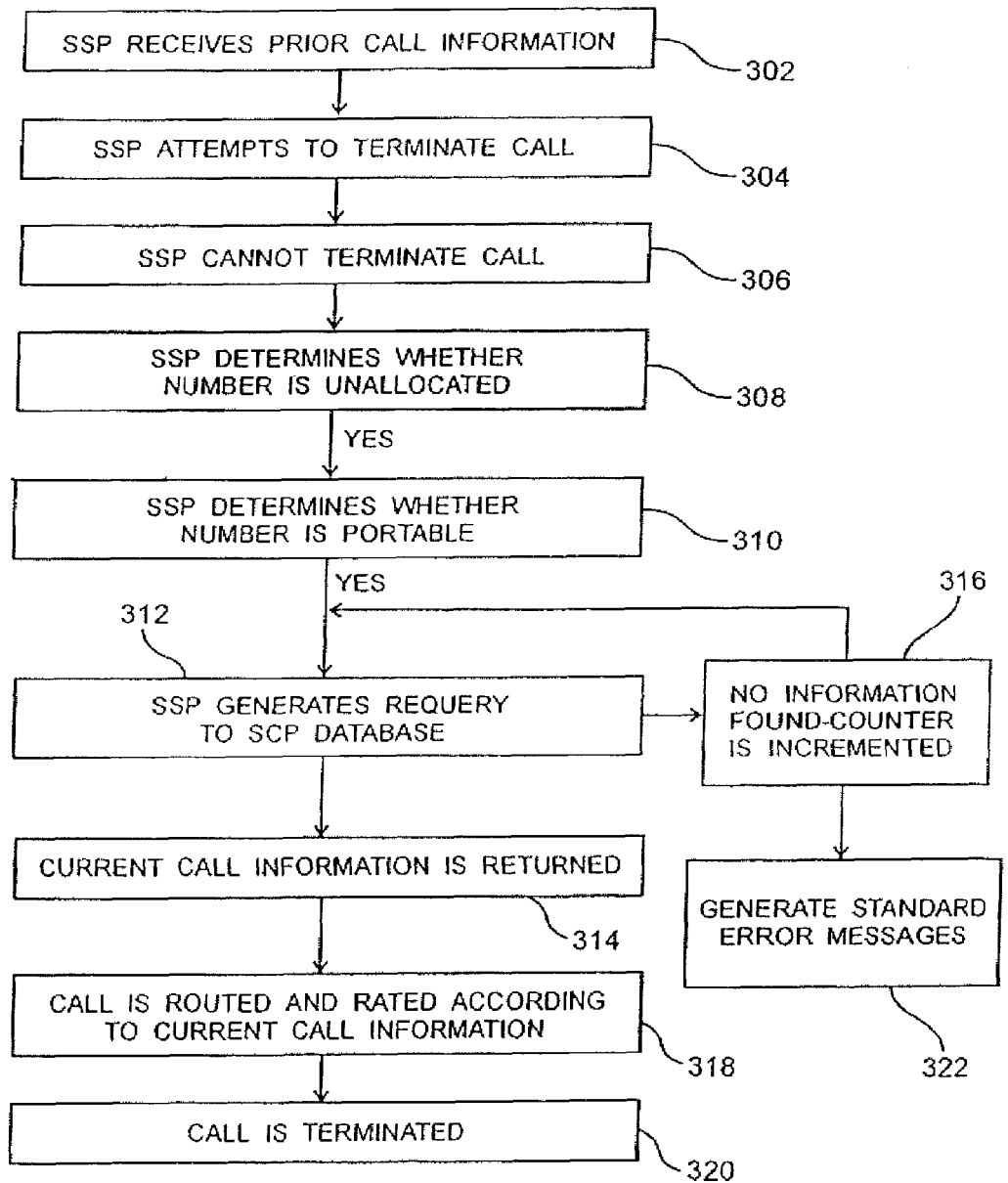
FIG. 4 is a flow chart for a method of a preferred embodiment for providing local number portability requery.

Referring now to FIGS. 3 and 4, a call originates when a calling party 161 dials the ten digit telephone number, the called telephone number, for customer A. The called telephone number is received by the remote SSP 160. The remote SSP 160, which supports SPNP, determines whether the called telephone number is portable by analyzing the first six digits or NPA/NXX of the called telephone number. If the called telephone number is portable, i.e. open to porting, the remote SSP 160 performs a remote query to its local SCP database 154 to obtain call routing information for the called telephone number. The SCP database 154 searches its database and locates the prior call information for the called telephone number, which associates the called telephone number with prior SSP 120. The SCP database 154 returns the prior call information for the called telephone number to the remote SSP 160.

After the remote SSP 160 receives the prior call information, the remote SSP 160 sets a query indicator to reflect that a query has been performed. Because the SCP database 154 doesn't contain the current call information to reflect customer A's move from prior SSP 120 to current SSP 122, the call will be routed to prior SSP 120. In addition, the prior call information and the query indicator will be forwarded to prior SSP 120.

Accordingly, prior SSP 120 receives the call (FIG. 4, step 302) from remote SSP 160. The prior SSP 120 then attempts to terminate the call (step 304) based upon the prior call information forwarded to it by the remote SSP 160. However, because customer A is no longer located at prior SSP 120, the call cannot be terminated (step 306) by prior SSP 120. Additionally, because the remote SSP 160 performed the remote query, the query indicator will show that a remote query has already been performed and according to the SPNP specification, no further queries can be performed by prior SSP 120 or any other SSP.

The embodiment enables the prior SSP 120, that was unable to terminate the call, to perform a second query, a requery to its local SCP database 114, when customer A's number is not found at prior SSP 120. According to the presently preferred embodiment, the requery is generated upon the satisfaction of two criteria. First, the prior SSP 120 that receives the call determines whether the called telephone number called is an unallocated number (step 308). To determine whether the called telephone number is unallocated, the prior SSP 120 identifies whether the called telephone number is located at the prior SSP 120 that received the call or whether the called telephone number is potentially located at another SSP. This determination can be made by determining whether the called telephone number is assigned at prior SSP 120. Next, the prior SSP 120 determines whether the first six digits of the number (NPA-NXX) is open to porting (310). This determination is preferably made by analyzing the IN or AIN software in the prior SSP 120 to identify whether the prior SSP's 120 trigger has been set to launch a requery when the specific combination of NPA-NXX is received and found to be unallocated. The prior SSP 120 trigger can be programmed to launch a requery when any predetermined combination or combinations of NPA-NXX are included within a called telephone number that cannot be terminated by prior SSP 120.

After the prior SSP 120 has determined that both of the above criteria are satisfied, the prior SSP 120 launches a requery (step 312) to the SCP database 114. The requery consists of both the called telephone number and additional data identifying the type of information requested by the prior SSP 120. The SCP 114 searches its database for current call information, including current call routing information and current call rating information, for the called telephone number and returns such information if it is found. The SCP 114 locates current call information which has been updated in the local SCP database 114, that reflects customer A's reassignment from prior SSP 120 to current SSP 122. Based upon the current call information, the prior SSP 120 can properly route the call (step 318) to the current SSP 122 that services customer A and an the proper cost for the call can be determined. Accordingly, current SSP 122 can terminate the call (step 320) to customer A by establishing a communication channel front remote SSP 160 to current SSP 122 via tandem switches 158, 118.

According to another aspect of the invention, the modification to the software within the SSP 120 includes a counter to prevent a potential for looping whereby continuous queries are launched when a called telephone number cannot be located and a call cannot be terminated. The counter can be sent to limit the maximum number of requeries allowed to be launched. A preferred counter setting is to limit the number of requeries to one. The counter is incremented (step 316) following step 312 if no current call routing information is found for the called telephone number after one requery has been executed by prior SSP 120. According to one aspect of the invention, a second requery can be generated in an attempt to obtain current call information. According to another aspect of the invention, if no current call information is found the call cannot be terminated and no further requeries will be performed.

The databases as shown are both internal and external to the SCPs. However, the databases can also be configured as part of the STPs as known to those skilled in the art. Accordingly, the depiction of the databases as internal or external to the SCPs should not limit the possible database configurations to those shown in the drawings.

The current or modified call information can be contained within a single database within a local network as described above. Alternatively, the current or modified call information can be contained within a plurality of databases within a local network. The databases can be updated with current or modified call information in several different manners. Typically, the databases will be linked to at least one other database, such as a local SMS. Additionally, the databases can be linked to a regional SMS. The link with the regional SMS enables current or modified call information, which is uploaded into the national or regional SMS to be downloaded from the regional SMS databases. This downloading is effectuated by channeling the current call information from the regional SMS through the local SMS and ultimately to the databases. The databases can also be updated with current or modified call information directly via a local SMS. The local SMS can be updated with current or modified call information by local service provider that has access to the local SMS. This current or modified call information can then be transferred directly from the local SMS to the database.

The hardware and software that comprise the SSP switches are available from a number of different switch vendors. The computer software that enables the SSPs to function in an IN or AIN environment and implement the present embodiment can be written in any suitable high level programming language. Typically, the individual switch vendor will have a preferred programming language. Additionally, this code can be implemented on any operating system or platform that is capable of supporting IN or AIN. These languages and operating platforms are well known to those skilled in the art.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method of processing a call, the method comprising:
    analyzing call information for a called telephone number to determine if the call information is current;
    obtaining modified call information for the called telephone number in response to determining that the call information is not current;
    routing a call using the modified call information; and
    regulating a number of attempts to obtain modified call information that can be made.

2. The method of claim 1, further comprising:
    receiving call information for a called telephone number.

3. The method of claim 1, wherein the call information is received from a remote location.

4. The method of claim 1, further comprising:
    storing the modified call information for the called telephone number in a data storage device.

5. The method of claim 4, wherein storing the modified call information for the called telephone number in a data storage device comprises storing modified call routing information for the called telephone number.

6. The method of claim 4, wherein storing the modified call information for the called telephone number in a data storage device comprises storing modified call rating information for the called telephone number.

7. The method of claim 4, wherein storing the modified call information for the called telephone number in a data storage device comprises storing modified call routing information and modified call rating information for the called telephone number.

8. The method of claim 4, wherein storing the modified call information for the called telephone number in a data storage device comprises storing modified call information for the called telephone number in response to the called telephone number being ported to a new location.

9. The method of claim 1, wherein analyzing call information to determine if the call information is current comprises:
    determining whether the called telephone number is unallocated.

10. The method of claim 1, wherein analyzing call information to determine if the call information is current comprises:
    determining whether the called telephone number is open to porting.

11. The method of claim 1, wherein obtaining modified call information for the called telephone number in response to a determination that the call information is not current comprises:
    performing a search to obtain modified call routing information.

12. The method of claim 1, wherein obtaining modified call information for the called telephone number in response to a determination that the call information is not current comprises:
    performing a search to obtain modified call routing information and modified call rating information.

13. The method of claim 1, wherein routing a call using the modified call information comprises:
    routing the call to a new location using the modified call information.

14. The method of claim 1, wherein routing a call using the modified call information comprises:
    routing the call to a switch using the modified call information.

15. The method of claim 1, wherein routing a call using the modified call information comprises:
    routing a call to a service switching point using the modified call information.

16. The method of claim 1, wherein routing a call using the modified call information comprises:
    routing a call to a service node using the modified call information.

17. The method of claim 1, wherein routing a call using the modified call information comprises:
    routing a call to an intelligent peripheral using the modified call information.

18. The method of claim 1, wherein routing a call using the modified call information comprises:
    routing a call to a voicemail system using the modified call information.

19. A computer-readable storage medium comprising a set of instructions for processing a call, the set of instructions to direct a processor to perform acts of:
    analyzing call information for a called telephone number to determine if the call information is current;
    obtaining modified call information for the called telephone number in response to determining that the call information is not current;
    routing a call using the modified call information; and
    regulating a number of attempts to obtain modified call information that can be made.

20. A system for processing a call, the system comprising:
    a network element operative to analyze call information for a called telephone number to determine if the call information is current, to obtain modified call information for the called telephone number in response to determining that the call information is not current, to route a call using the modified call information, and to regulate a number of attempts to obtain modified call information that can be made.

* * * * *